United States Patent
Zhang et al.

(10) Patent No.: US 9,442,807 B1
(45) Date of Patent: Sep. 13, 2016

(54) HANDLING DATA SEGMENTS IN DEDUPLICATION

(71) Applicant: Symantec Corporation, Mountain View, CA (US)

(72) Inventors: Xianbo Zhang, Mountain View, CA (US); Haigang Wang, Mountain View, CA (US); Haibin She, Mountain View, CA (US); Wim Goedertier, Mountain View, CA (US)

(73) Assignee: Veritas Technologies, LLC, Mountain View, CA (US)

( * ) Notice: Subject to any disclaimer, the term of this patent is extended or adjusted under 35 U.S.C. 154(b) by 380 days.

(21) Appl. No.: 13/935,405

(22) Filed: Jul. 3, 2013

Related U.S. Application Data (60) Provisional application No. 61/828,403, filed on May 29, 2013.

(51) Int. Cl.
- *G06F 17/30* (2006.01)
- *G06F 7/00* (2006.01)
- *G06F 11/14* (2006.01)

(52) U.S. Cl.
CPC ................................. *G06F 11/1453* (2013.01)

(58) Field of Classification Search
CPC ...................................................... G06F 17/30
USPC .......................................................... 707/692
See application file for complete search history.

(56) References Cited

U.S. PATENT DOCUMENTS

| | | | |
|---|---|---|---|
| 8,166,261 B1 * | 4/2012 | Cremelie et al. | 711/161 |
| 8,745,003 B1 * | 6/2014 | Patterson | 707/639 |
| 2010/0174684 A1 * | 7/2010 | Schwaab et al. | 707/655 |
| 2010/0250858 A1 * | 9/2010 | Cremelie et al. | 711/136 |
| 2015/0242428 A1 * | 8/2015 | Niles | G03B 3/10 707/646 |

* cited by examiner

*Primary Examiner* — Sangwoo Ahn
(74) *Attorney, Agent, or Firm* — Womble Carlyle Sandridge & Rice LLP (57) ABSTRACT

In some embodiments, a method of maintaining a reference list for data deduplication is provided. The method includes discarding a newly arriving data segment in response to finding a fingerprint of the newly arriving data segment matches an existing fingerprint in a plurality of fingerprints on a fingerprint-to-file reference list. The method includes adding, in the fingerprint-to-file reference list, to a list for the existing fingerprint, a source for the newly arriving data segment, in response to the fingerprint-to-file reference list indicating the existing fingerprint does not correspond to a hot data segment and setting an indication in the fingerprint-to-file reference list that the existing fingerprint corresponds to the hot data segment in response to the list for the existing fingerprint meeting or exceeding a predetermined number of entries. Other embodiments are included.

18 Claims, 5 Drawing Sheets

| FilePath1: FileName1 | FP(1), FP(2), FP(10)...... |
| FilePath2: FileName2 | FP(1), FP(20),...... |
| ⋮ | ⋮ |
| FilePathN: FileNameN | FP(2), FP(20), FP...... |

FP(1) Hot=0 Filepath1 : FileName1, Filepath2 : FileName2,.....
FP(2) Hot=1 Filepath1 : FileName1, FilepathN : FileNameN,.....
⋮
FP(N) Hot=1 • • •

| FP(1) | Location of S(1) in Content Memory |
| FP(2) | Location of S(2) in Content Memory |
| ⋮ | |
| FP(N) | Location of S(N) in Content Memory |

HANDLING DATA SEGMENTS IN DEDUPLICATION

CLAIM OF PRIORITY

This application claims priority to U.S. Application Ser. No. 61/828,403 entitled "HANDLING DATA SEGMENTS IN DEDUPLICATION," which is incorporated herein by reference for all purposes.

BACKGROUND

Data deduplication is applied during data backup operations, in order to conserve storage space. A data segment that is shared by many files need only be stored once in backup storage. Typically, a data deduplication system maintains a list of fingerprints of data segments. Newly arriving data segments have their fingerprints compared with the fingerprints on the list, in order to determine whether or not a copy of a data segment is already stored in the backup storage. If the deduplication system does not find a match to a fingerprint, the newly arriving data segment is then stored in the backup storage, and the new fingerprint is added to the fingerprint list that contains fingerprints which represent data segments stored. If the deduplication system finds a match to a fingerprint, the newly arriving data segment is discarded, i.e., not again stored in the backup storage, and a reference is added to the corresponding existing segment. One critical function of a deduplication system is to track how segments are referenced by different files and backup images. Some data segments in the backup storage are popular and are widely referenced by many files and backup images. These so-called "hot" segments may come from system files, virtual machines, static files, database blocks, etc. Over time, the popularity of some segments may change, e.g., file system patch updates on backup clients may make popular segments become obsolete (not hot anymore). In some systems, the list of fingerprints used in deduplication is frequently updated, so that unused data segments can be deleted from the backup storage in order to free up storage space. However, frequent updates to the list of fingerprints consume system time, and slow down reference processing. Therefore, there is a need in the art for a solution which overcomes the drawbacks described above.

SUMMARY

In some embodiments, a method of maintaining a reference list for data deduplication is provided. The method includes establishing a fingerprint-to-file reference list having a plurality of fingerprints of data segments, where each fingerprint of the plurality of fingerprints corresponding to a data segment stored in a memory, each fingerprint of the plurality of fingerprints having a list of backed up files, each backed up file as referred to on the list of files including a data segment having a corresponding fingerprint matching the fingerprint of the plurality of fingerprints. The method includes deduplicating data segments via application of the fingerprint-to-file reference list and updating the fingerprint-to-file reference list each time an existing fingerprint of the plurality of fingerprints is matched in a comparison to a newly arriving fingerprint of a newly arriving data segment, unless the reference list indicates the existing fingerprint corresponds to a hot data segment. The method includes indicating, in the reference list, the existing fingerprint corresponds to the hot data segment in response to the reference list having for the existing fingerprint the list of backed up files meeting or exceeding a threshold.

In some embodiments, a non-transient, tangible, computer-readable media having thereupon instructions which, when executed by a processor, cause the processor to execute a method. The method includes discarding a newly arriving data segment in response to finding a fingerprint of the newly arriving data segment matches an existing fingerprint in a plurality of fingerprints on a fingerprint-to-file reference list. The method includes adding, in the fingerprint-to-file reference list, a source for the newly arriving data segment, in response to the fingerprint-to-file reference list indicating the existing fingerprint does not correspond to a hot data segment. The method includes setting an indication in the fingerprint-to-file reference list that the existing fingerprint corresponds to the hot data segment in response to a list for the existing fingerprint meeting or exceeding a predetermined number of entries.

In some embodiments, a data deduplication system that includes a memory configured to store data segments, a fingerprint-to-file reference list configured to store a plurality of fingerprints, each fingerprint of the plurality of fingerprints having an associated list of files and a hot attribute, and a server configured to perform backup. The server includes a processor operable to execute instructions causing the processor to store deduplicated data segments in the memory via application of the fingerprint-to-file reference list. The processor executing the instructions is operable to add a filename to the associated list of files for an existing fingerprint in the fingerprint-to-file reference list as a result of the server finding that a newly arriving fingerprint of a newly arriving data segment from a file having the filename matches the existing fingerprint, and the server finding that the hot attribute of the existing fingerprint is cleared, indicating an existing data segment in the memory, corresponding to the existing fingerprint, is not a hot segment. The processor executing the instructions is operable to set the hot attribute of the existing fingerprint in the fingerprint-to-file reference list as a result of the associated list of files for the existing fingerprint in the fingerprint-to-file reference list meeting or exceeding a predetermined size.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A deduplication system described with reference to FIGS. 1-4 makes use of a reference list that has fingerprints of some or many of the data segments stored in a content memory. The reference list size is used as a threshold to identify hot segments and exclude the hot segments from routine updates in some embodiments. Periodically, the segments are reevaluated to determine if their popularity or frequency of use changes. It should be appreciated that the reevaluation avoids storage leakage when the popularity of a segment drops such that the segment is no longer referenced.

Fingerprints of newly arriving data segments are compared to fingerprints on the reference list, for deduplication of the data segments during a data backup operation. Each time a newly arriving data segment finds a fingerprint match on the reference list, the file name from which that newly arriving data segment originated is added to a list of files associated with the existing fingerprint on the reference list. This list of files is updated (with successive matches) until the list of files for the fingerprint meets or exceeds a threshold. Once the threshold is met or exceeded, the list is no longer updated for that fingerprint, and that particular data segment is designated a hot segment. An indication is set in the reference list that the existing fingerprint corresponds to the hot data segment. The reference list is periodically rebuilt, so that fingerprints that are no longer used, and corresponding data segments that are no longer used, can be purged from the system, to preserve data capacity for backup. By eliminating updates to the reference list once the threshold is met or exceeded, the system achieves improved efficiency as compared to a system that continually updates the reference list.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
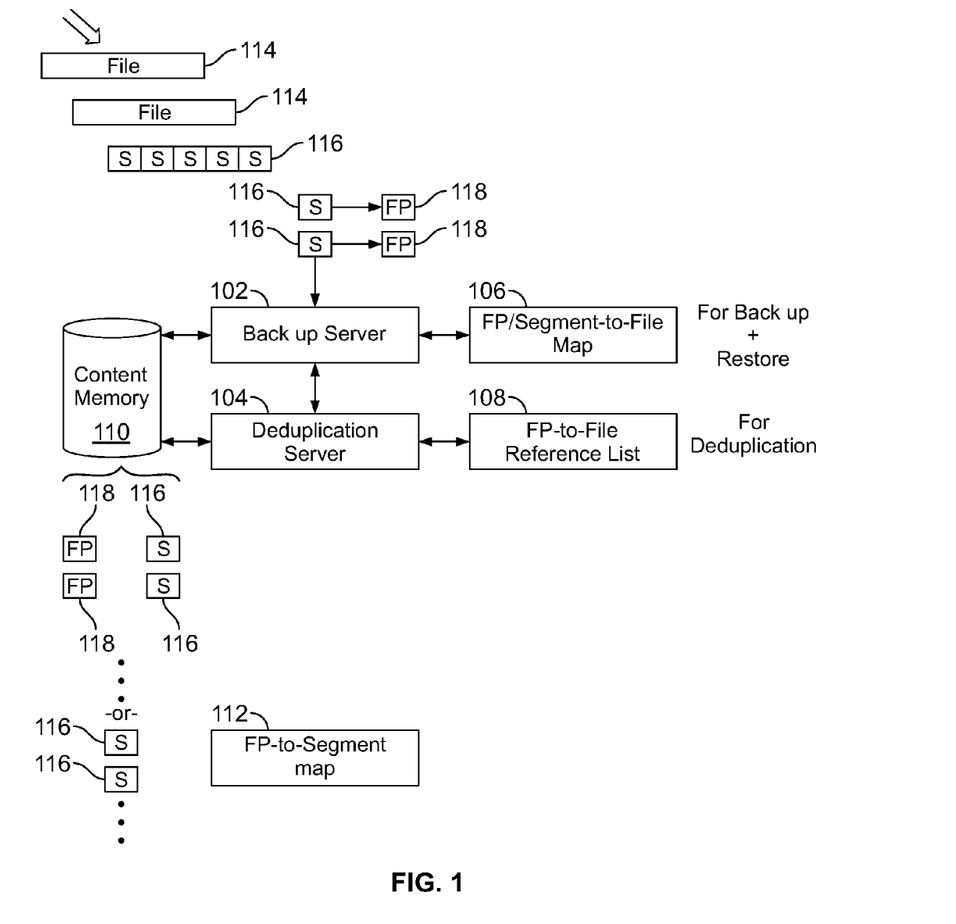
FIG. 1 is a schematic diagram of a deduplication system in accordance with some embodiments.

FIG. 1 shows a data deduplication system performing a backup operation in accordance with some embodiments. The deduplication system has a backup server 102 cooperating with a deduplication server 104 to back up files 114. The deduplication system stores deduplicated data in a content memory 110 in some embodiments. In various embodiments, the content memory 110 includes hard disk, optical disk, flash memory or other nonvolatile storage media. A stream of incoming files 114 is presented to the backup server 102 for backup operations. In the example shown, each file 114 is made up of and is broken out into data segments 116. In further embodiments, a data segment could be less than the size of a file, greater than the size of a file, or equal to the size of a file. Each data segment 116 is associated with a fingerprint 118. The fingerprint 118 could be derived using a hash function or other fingerprinting algorithm, and could be provided with the data segment 116, or derived by the backup server 102 or a fingerprinting module. In further embodiments, the backup server 102 and the deduplication server 104 could be combined, or split into further modules, or share modules.

Still referring to FIG. 1, the backup server 102 backs up or stores the data segments 116 in such a manner that the files from which the data segments 116 originate can be restored in case of a failure of a system being backed up. In order to do so, the backup server 102 establishes and makes use of a fingerprint/segment-to-file map 106. For each data segment 116 backed up, the backup server 102 writes a pointer, a record, or other data to the fingerprint/segment-to-file map 106 indicating the file from which the data segment 116 and corresponding fingerprint 118 originated. That is, the fingerprint/segment-to-file map 106 functions to map fingerprints 118 and data segments 116 to files 114, so that each file can be reconstructed by fetching data segments 116 from the content memory 110 and reassembling the data segments 116 into the files 114 that were backed up. In order to be able to restore any file that has been backed up, the fingerprint/segment-to-file map 106 maintains a complete list of all files 114 that are backed up in a specified backup run, and the data segments 116 that make up these files 114.

For each newly arriving data segment 116 of FIG. 1, the backup server 102 transmits the data segment 116 to the deduplication server 104, which decides whether and how to store the data segment 116. The deduplication server 104 establishes and makes use of a fingerprint-to-file reference list 108 for this functionality. To build the fingerprint-to-file reference list 108, the deduplication server 104 adds the fingerprint 118 of a data segment 116 to the fingerprint-to-file reference list 108 as the deduplication server 104 sends the data segment 116 to the content memory 110 for storage. The deduplication server 104 also adds a pointer, a record or other data to the fingerprint-to-file reference list 108 indicating the file from which the data segment 116 giving rise to the fingerprint 118 originated. That is, the fingerprint-to-file reference list 108 acts to map fingerprints 118 to files 114, so that for any fingerprint 118, a file 114 can be located that makes use of the segment 116 that corresponds to the fingerprint 118. In some embodiments, the sequence of building the fingerprint-to-file reference list 108 is repeated until the fingerprint-to-file reference list 108 is complete, and in other embodiments the sequence of building the fingerprint-to-file reference list 108 is interleaved or intermingled with one or more sequences of deduplication.

Continuing with FIG. 1, for a data deduplication process, when the backup server 102 provides a data segment 116 to the deduplication server 104, the deduplication server 104 attempts to find a match for the fingerprint 118 of the data segment 116, in the fingerprint-to-file reference list 108. If the deduplication server 104 does not find a match in the fingerprint-to-file reference list 108, the deduplication server 104 sends the data segment 116 to the content memory 110 for storage. If the fingerprint-to-file reference list 108 is still being built, the deduplication server 104 adds the fingerprint 118 and the pointer, record or other data indicating the file from which the data segment 116 originated, to the fingerprint-to-file reference list 108. If the deduplication server 104 does find a match in the fingerprint-to-file reference list 108, the deduplication server 104 discards the data segment 116, i.e., does not newly store the data segment 116 in the content memory 110, since a copy of the data segment 116 is already present in the content memory 110. Conditionally, a pointer, record or other data indicating the file from which the newly arriving and presently discarded data segment 116 originated is added to the list for the fingerprint 118. This list resides in the fingerprint-to-file reference list 108, under the fingerprint 118. The condition for adding or not adding to the list is based upon the size or length of the list, and a threshold, in some embodiments.

In one embodiment, the threshold is a predetermined number of entries to the reference list of a segment. In further embodiments, the threshold is a predetermined list length, list size or list depth of a segment. If the list of files from which a data segment 116 originated, associated with a fingerprint 118, is less than the threshold, the deduplication server 104 adds the newest pointer, record or other data to the list. If the list of files from which a data segment 116 originated, associated with a fingerprint 118, is greater than or equal to the threshold, a "hot" attribute is set for the fingerprint 118 and the deduplication server 104 does not add the newest pointer, record or other data to the list, i.e., does not update the list. The "hot" attribute indicates that the fingerprint 118 is associated with a "hot" data segment, which is frequently referenced and matched during deduplication of arriving data segments. Data segments 116, subject to deduplication, are stored in the content memory 110. In some embodiments, each data segment 116 is accompanied by a corresponding fingerprint 118, with data segments 116 and fingerprint 118 associated with each other and stored in the content memory 110. Various association mechanisms such as content addressable memory, address schemes, pointers, relational databases and so on are used in various embodiments. In other embodiments, the data segments 116 are stored in the content memory 110, and the deduplication server 104 maintains a separate fingerprint-to-segment map 112. The fingerprint-to-segment map 112 maps fingerprints 118 to data segments 116, so that for a specified fingerprint 118, the corresponding data segment 116 can be retrieved from the content memory 110. Retrieving data segments 116 from the content memory 110 for restoring backed up data is achieved through various mechanisms in various embodiments.

Figure 2A:
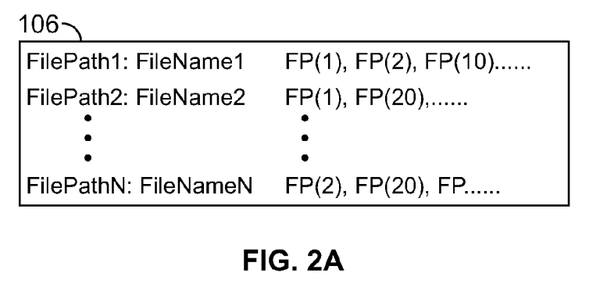
FIG. 2A is a schematic diagram of the fingerprint/segment-to-file map of FIG. 1 in accordance with some embodiments.

FIG. 2A shows an embodiment of the fingerprint/segment-to-file map 106. This could be implemented as a file, a database or other data structure. The fingerprint/segment-to-file map 106 includes a list of file paths and filenames, and all of the fingerprints associated with each of these. For example, for a first file being backed up, there is an entry in the fingerprint/segment-to-file map 106 showing the first file path and the first filename along with an associated list of fingerprints of the data segments that make up the first file. This entry is placed into the fingerprint/segment-to-file map 106 by the backup server 102, as the first file is being backed up. Subsequent entries follow a similar format. In order to restore the first file, the backup server 102 would look up the file path information for the first file, and then retrieve from the content memory 110 the data segments 116 associated with the fingerprints listed in the entry. The backup server 102 would do so using the associated fingerprints 118 and data segments 116 in one embodiment of the content memory 110, or using the fingerprint-to-segment map 112 in other embodiments of the content memory 110. In further embodiments of the fingerprint/segment-to-file map 106, other mappings of fingerprints, other mappings of segments, or other types of data sources could be used as appropriate to various data structures and backup systems. Such embodiments could be termed a fingerprint-to-file map, a segment-to-file map, a fingerprint-to-data source map, a segment-to-data source map and so on. In some embodiments, a journal is used in place of or as part of the fingerprint/segment-to-file map 106. When a backup image or file is removed, the corresponding map entry is removed from the fingerprint/segment-to-file map in some embodiments.

Figure 2B:
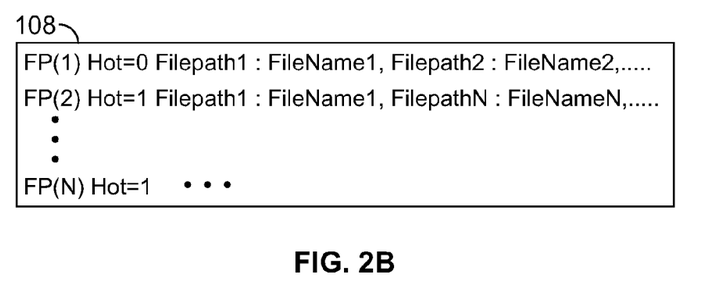
FIG. 2B is a schematic diagram of the fingerprint-to-file reference list of FIG. 1 in accordance with some embodiments.

FIG. 2B shows an embodiment of the fingerprint-to-file reference list 108. It should be appreciated that the fingerprint-to-file reference list 108 could be implemented as a file, a database or other data structure. The fingerprint-to-file reference list 108 includes a list of fingerprints, and file paths and filenames associated with each of the fingerprints. For example, for a first fingerprint FP(1), there is an entry in the fingerprint-to-file reference list 108 showing the first fingerprint and an associated list of file paths and filenames of files that have one or more data segments whose fingerprints match the first fingerprint. The "hot" attribute for the first fingerprint has been cleared, or set to a value of zero or false. The "hot" attribute for the second fingerprint FP(2) has been set to a value of one or true, as a result of the second fingerprint having a list of filenames with the number of filenames equal to the threshold value. In further embodiments, other types of indicators for a "hot" data segment and associated fingerprint could be used. In the example shown, a first file and a second file each have data segments that produce a fingerprint that matches the first fingerprint in the fingerprint-to-file reference list 108. A first file and an Nth file FP(N) each have data segments that produce a fingerprint that matches the second fingerprint in the fingerprint-to-file reference list 108. Other files may have data segments that each produces a fingerprint that matches the Nth fingerprint in the fingerprint-to-file reference list 108. In order to provide for effective data deduplication, the fingerprint-to-file reference list 108 does not need to have a complete list of fingerprints 118 for all data segments 116 stored in content memory 110. In further embodiments of the fingerprint-to-file reference list 108, other mappings of fingerprints, other mappings of files, or other types of data sources could be used as appropriate to various data structures and backup systems. Such embodiments could be termed a fingerprint-to-data source reference list or a fingerprint-to-data source map. In some embodiments, a fingerprint index is constructed from the fingerprint-to-file reference list 108, and newly arriving fingerprints are tested against the fingerprint index for a match.

Figure 2C:
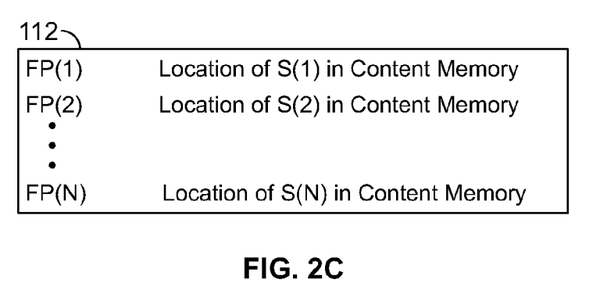
FIG. 2C is a schematic diagram of the fingerprint-to-segment map of FIG. 1 in accordance with some embodiments.

FIG. 2C shows an embodiment of the fingerprint-to-segment map 112. It should be appreciated that the fingerprint-to-segment map 112 could be implemented as a file, a database or other data structure. The fingerprint-to-segment map 112 includes a list of fingerprints and pointers to the data segments stored in the content memory. For example, the first fingerprint FP(1) has an entry in the fingerprint-to-segment map 112 along with a pointer to the location of the first segment in the content memory, such that the first segment generates the first fingerprint. The list of the remaining fingerprints in the fingerprint-to-segment map 112 is similarly constructed. It should be appreciated that the structure of the maps and lists of FIGS. 2A-C is not meant to be limiting as alternative structures may be utilized to achieve the functionality described herein.

Figure 3:
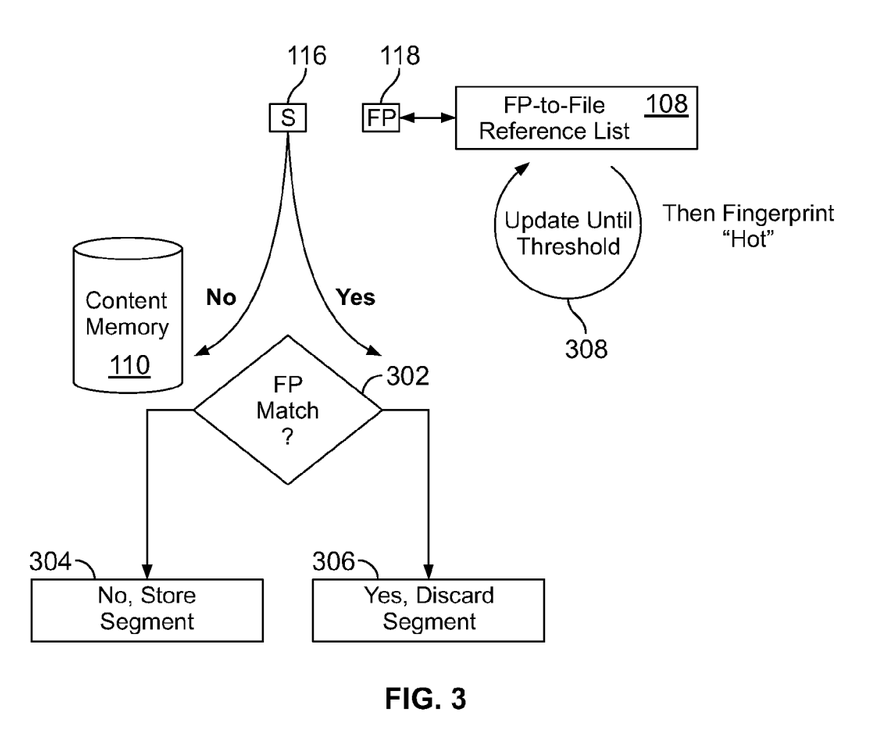
FIG. 3 is a schematic diagram showing data deduplication as performed using the fingerprint-to-file reference list of FIGS. 1 and 2B in accordance with some embodiments.

FIG. 3 illustrates a data deduplication technique using the fingerprint-to-file reference list 108 in accordance with some embodiments. A newly arriving data segment 116 has an associated fingerprint 118. The fingerprint 118 is checked for a match in the fingerprint-to-file reference list 108. If a condition test 302 determines there is no match, the data segment 116 is stored in the content memory 110, per the action block 304, and the fingerprint 118 is added to the fingerprint-to-file reference list. If the condition test 302 determines there is a match, i.e., the newly arriving fingerprint 118 matches an existing fingerprint in the fingerprint-to-file reference list 108, the data segment 116 is discarded, per the action block 306. The fingerprint-to-file reference list 108 is updated as to the fingerprint 118 and the origins of the data segment 116, until or unless a threshold for the length of the list (e.g., the number of files on the list) associated with the fingerprint 118 is reached, per the action loop 308. When the threshold is reached, the fingerprint is declared "hot", in the fingerprint-to-file reference list 108. Once the fingerprint is declared "hot", i.e., the fingerprint is frequently matched and the corresponding data segment is "hot", the fingerprint is no longer updated in the fingerprint-to-file reference list 108 for any subsequent matches to newly arriving fingerprints. As illustrated above, the fingerprint 118 may be declared "hot" by flipping or transforming a bit from 0 to 1, or 1 to 0, in some embodiments.

Figure 4:
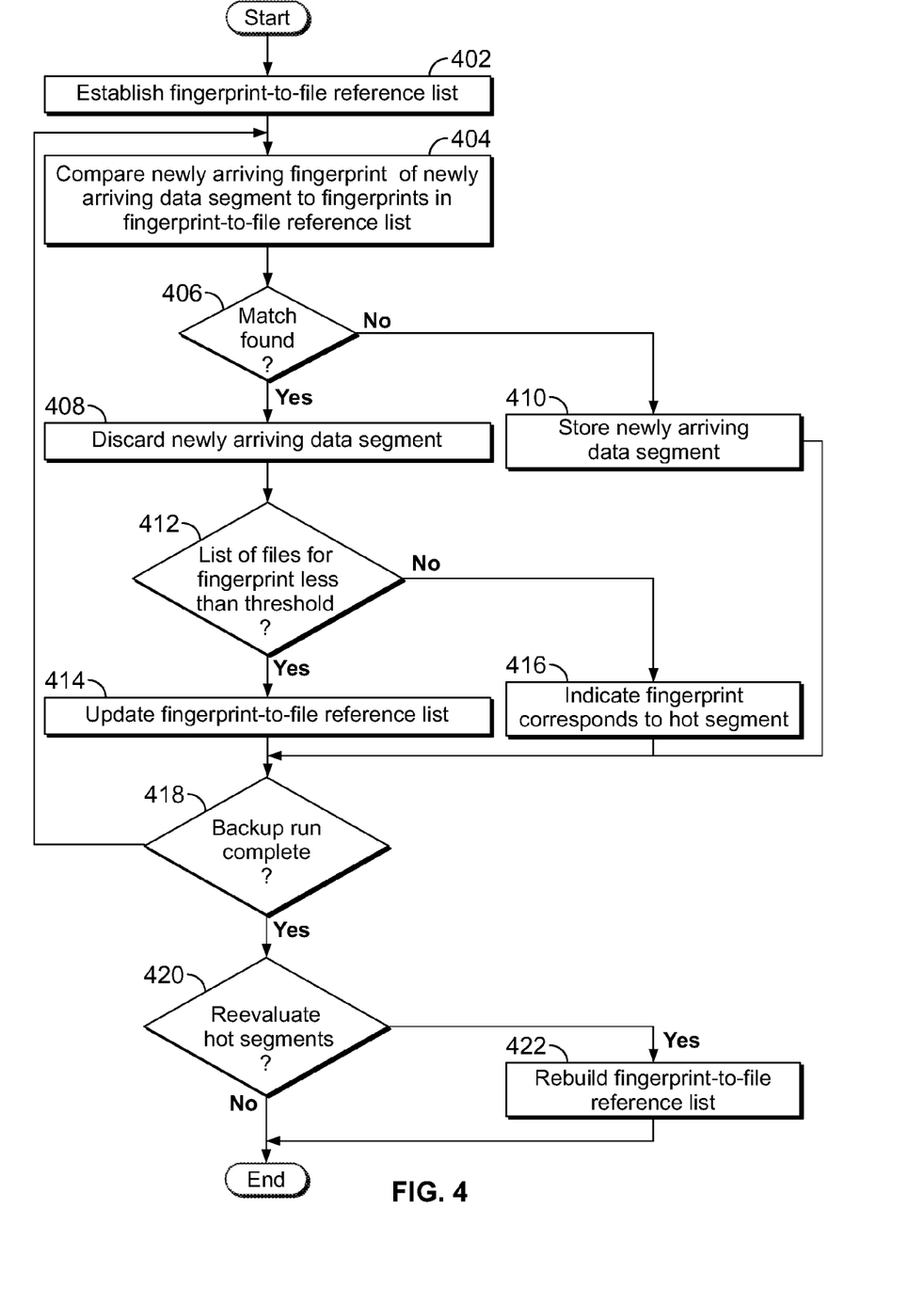
FIG. 4 is a flow diagram of a method of deduplication, which can be performed using the deduplication system of FIG. 1 in accordance with some embodiments.

FIG. 4 shows a flow diagram for a method of deduplication and maintenance of a fingerprint-to-file reference list in accordance with some embodiments. The method and variations thereof could be implemented using the deduplication system of FIG. 1, for example using one or more processors or specially programmed computers of the backup and/or deduplication servers. From a start point, the fingerprint-to-file reference list is established in an action 402. For example, the fingerprint-to-file reference list shown in FIG. 1, 2B or 3 could be used. In an action 404, a newly arriving fingerprint of a newly arriving data segment is compared to fingerprints in the fingerprint-to-file reference list. This could be done using a software comparison, a hardware comparator, a state machine or other embodiment as shown in FIG. 1 or 3.

In a decision action 406, it is determined if a match is found. For example, a processor may find a match in the fingerprint-to-file reference list for the newly arriving fingerprint. In various embodiments, the fingerprint search in the fingerprint-to-file reference list could be partial or complete. If a match is not found, the flow branches to the action 410, in which the newly arriving data segment is stored. For example, the data segment could be stored in memory as shown in FIGS. 1 and 3. In some embodiments, a fingerprint of the newly arriving data segment is added to the fingerprint-to-file reference list, e.g., as part of the process of building the fingerprint-to-file reference list up to a predetermined or adjustable length. Flow then proceeds to the decision action 418.

If a match is found, the flow branches from the decision action 406 to the action 408, in which the newly arriving data segment is discarded, i.e., not newly stored in a backup storage. For example, finding a match in the fingerprint-to-file reference list indicates that a data segment bearing the requisite fingerprint is already stored in the content memory of FIG. 1. Continuing in the embodiment where a match is found, the decision action 412 determines if the list of files for the fingerprint is less than the threshold. For example, this functionality could be performed by checking the number of items on the list of files, or checking for the "hot" attribute of the fingerprint in the fingerprint-to-file reference list. If the "hot" attribute is set, there is no need to check the number of items on the list of the files, as the "hot" attribute indicates such check has previously been performed and the condition met. If the "hot" attribute is not set, the software through the processor could check the number of items on the list of files in some embodiments. In a further embodiment, the check verifies whether the number of items on the list of files is greater than or equal to the threshold. Various checking and decision mechanisms are readily devised. If it is determined that the list of files for the fingerprint is less than the threshold, the fingerprint and segment are not yet hot, and the fingerprint-to-file reference list is updated in an action 414. For example, the file or other source for the data segment is added to the list of files for the fingerprint. If it is determined that the list of files for the fingerprint is not less than the threshold, the action 416 indicates that the fingerprint corresponds to a hot segment. For example, the action 416 could set a "hot" attribute of the fingerprint in the fingerprint-to-file reference list. The fingerprint-to-file reference list is not updated. Flow then proceeds to the decision action 418.

In the decision action 418, it is determined if the backup run is complete. If the answer is no, the backup run is not yet complete, flow branches back to the action 404 in order to look at additional newly arriving data segments and newly arriving fingerprints. If the answer is yes, the backup run is complete, flow proceeds to the decision action 420. In the decision action 420, it is determined if the classification of hot segments should be reevaluated. In some embodiments, this decision is made on a calendar or other periodic basis, e.g., every six months or other time period, the hot segments are reevaluated. In other embodiments, this decision is made on a space usage of the hot segments, e.g., at some level of memory utilization, the hot segments are reevaluated. Further criteria are readily devised. If the answer is no, the hot segments should not be reevaluated, the flow branches to an endpoint. If the answer is yes in action 418, the classification of the hot segments should be reevaluated, flow proceeds to the action 422, in which the fingerprint-to-file reference list is rebuilt. For example, entries in the fingerprint-to-file reference list could be deleted, and the fingerprint-to-file reference list is rebuilt based on fingerprint/segment-to-file map. During the reference list rebuilding, no data segment should be deleted. Segments that are unused after the rebuilding could then be deleted from the memory, as could the associated fingerprints in the fingerprint-to-file reference list, which would free up space in the content memory and in the fingerprint-to-file reference list. After the action 422, the flow reaches an endpoint.

It should be appreciated that the methods described herein may be performed with a digital processing system, such as a conventional, general-purpose computer system. Special purpose computers, which are designed or programmed to perform only one function may be used in the alternative.

Figure 5:
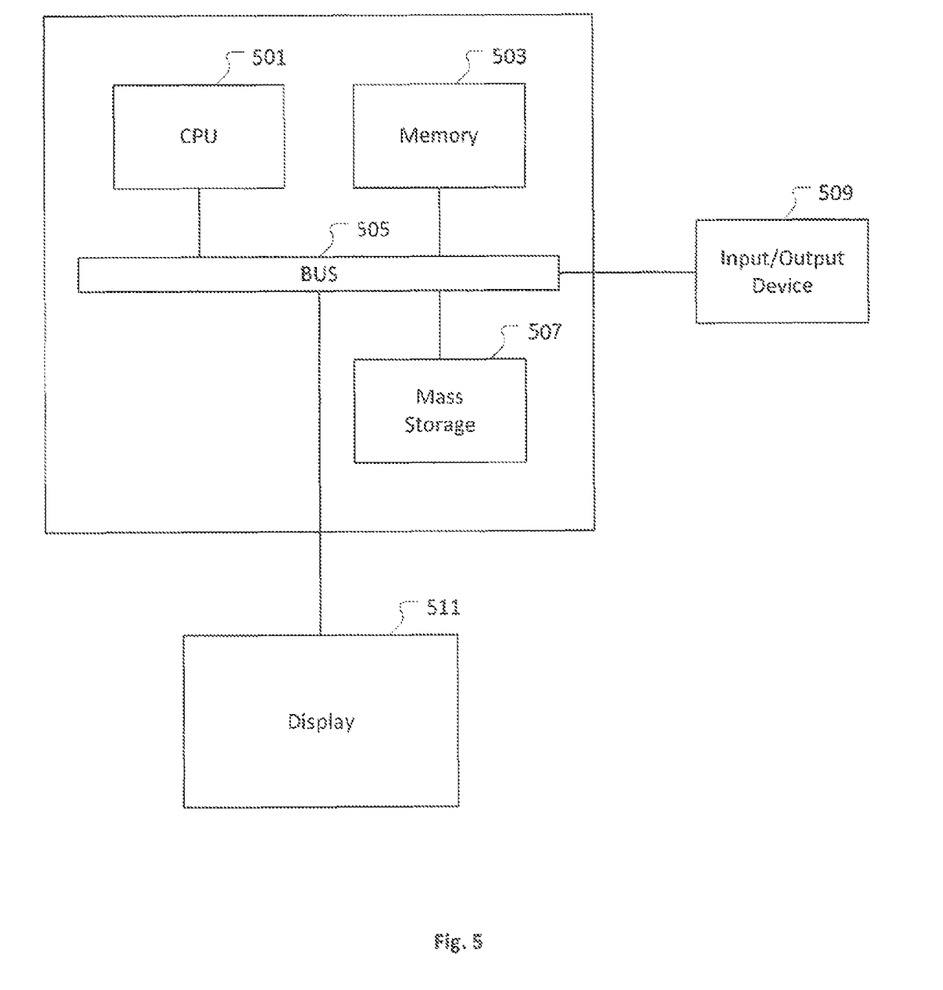
FIG. 5 is an illustration showing a computing device which may implement the embodiments described herein.

FIG. 5 is an illustration showing an exemplary computing device which may implement the embodiments described herein. The computing device of FIG. 5 may be used to perform embodiments of the functionality for the deduplication and maintenance of a fingerprint-to-file reference list in accordance with some embodiments. The computing device includes a central processing unit (CPU) 501, which is coupled through a bus 505 to a memory 503, and mass storage device 507. Mass storage device 507 represents a persistent data storage device such as a floppy disc drive or a fixed disc drive, which may be local or remote in some embodiments. Memory 503 may include read only memory, random access memory, etc. Applications resident on the computing device may be stored on or accessed via a computer readable medium such as memory 503 or mass storage device 507 in some embodiments. Applications may also be in the form of modulated electronic signals modulated accessed via a network modem or other network interface of the computing device. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. Display 511 is configured to display any visualization tools or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute the functionality described herein to enable the functionality described with reference to FIGS. 1-4. The code embodying this functionality may be stored within memory 503 or mass storage device 507 for execution by a processor such as CPU 501 in some embodiments. The operating system on the computing device may be MS DOS™, MS-WINDOWS™, OS/2™ UNIX™, LINUX™, or other known operating systems. It should be appreciated that the embodiments described herein may be integrated with virtualized computing system also.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated or transformed. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Implementations of the invention may be made in hardware, firmware, software, or various combinations thereof. The embodiments can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, flash, and other optical and non-optical data storage devices. The computer readable medium can also be distributed over a network coupled computer system so that the computer readable code is stored and executed in a distributed fashion, e.g., in a cloud computing environment. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed and virtual computing environments where tasks are performed by remote processing devices that are linked through a wire-based or wireless network. In one implementation, the machine-readable medium may include various mechanisms for storing and/or transmitting information in a form that can be read by a machine (e.g., a computing device). While firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of maintaining a reference list for data deduplication, comprising:
establishing a fingerprint-to-file reference list having a plurality of fingerprints of data segments, each fingerprint of the plurality of fingerprints having a corresponding data segment stored in a memory and having on the fingerprint-to-file reference list a list of backed up files with each file of the list of backed up files including a data segment to which the each fingerprint matches;
deduplicating data segments via application of the fingerprint-to-file reference list;

updating the fingerprint-to-file reference list each time an existing fingerprint of the plurality of fingerprints is matched in a comparison to a newly arriving fingerprint of a newly arriving data segment, unless the fingerprint-to-file reference list indicates the existing fingerprint corresponds to a hot data segment; and excluding a list for the existing fingerprint, in the fingerprint-to-file reference list, from updating during deduplication, in response to the indication in the fingerprint-to-file reference list that the existing fingerprint corresponds to the hot data segment.

2. The method of claim 1, wherein establishing the fingerprint-to-file reference list includes:
adding a fingerprint of a first data segment to the fingerprint-to-file reference list;
adding to the fingerprint-to-file reference list an indication of a file from which the first data segment originates; and
storing the first data segment in the memory.

3. The method of claim 1, wherein the memory includes at least one from a set consisting of: a hard disk, an optical disk, a flash memory, and nonvolatile storage media.

4. The method of claim 1, wherein updating the fingerprint-to-file reference list includes adding to the fingerprint-to-file reference list an indication of a file from which the newly arriving data segment originates.

5. The method of claim 1, wherein deduplicating data segments via application of the fingerprint-to-file reference list includes:
discarding the newly arriving data segment in response to the newly arriving fingerprint of the newly arriving data segment matching the existing fingerprint of the plurality of fingerprints in the fingerprint-to-file reference list.

6. The method of claim 1, further comprising:
indicating, in the fingerprint-to-file reference list, the existing fingerprint corresponds to the hot data segment in response to the reference list having for the existing fingerprint the list of backed up files meeting or exceeding a threshold, wherein the threshold includes a predetermined number of entries to each list of backed up files in the fingerprint-to-file reference list.

7. The method of claim 1, wherein indicating the existing fingerprint corresponds to the hot data segment includes setting an attribute in the fingerprint-to-file reference list, the attribute associated with the existing fingerprint.

8. The method of claim 1, further comprising:
reevaluating classification of hot data segments after a completion of a backup run.

9. A non-transitory, tangible, computer-readable media having thereupon instructions which, when executed by a processor, cause the processor to execute a method comprising:
discarding a newly arriving data segment in response to finding a fingerprint of the newly arriving data segment matches an existing fingerprint in a plurality of fingerprints on a fingerprint-to-file reference list;
adding, in the fingerprint-to-file reference list, a source for the newly arriving data segment, in response to the fingerprint-to-file reference list indicating the existing fingerprint does not correspond to a hot data segment;
setting an indication in the fingerprint-to-file reference list that the existing fingerprint corresponds to the hot data segment in response to a list for the existing fingerprint meeting or exceeding a predetermined number of entries; and excluding the list for the existing fingerprint, in the fingerprint-to-file reference list, from updating in response to the indication in the fingerprint-to-file reference list that the existing fingerprint corresponds to the hot data segment.

10. The computer-readable media of claim 9, wherein the method further comprises:
purging no longer used data segments and corresponding fingerprints; and rebuilding the fingerprint-to-file reference list.

11. The computer-readable media of claim 9, wherein setting the indication includes:
setting a hot attribute for the existing fingerprint in the fingerprint-to-file reference list.

12. The computer-readable media of claim 9, wherein the method further comprises:
building a fingerprint/segment-to-file map, usable for a restoration of a file and
rebuilding fingerprint-to-file reference list.

13. The computer-readable media of claim 9, wherein the source for the newly arriving data segment is a file, and adding the source to the list for the existing fingerprint includes adding a filename of the file to the list.

14. The computer-readable media of claim 9, wherein the method further comprises:
placing an entry in a journal during backup, the journal usable for file restoration.

15. A data deduplication system, comprising:
a memory configured to store data segments;
a fingerprint-to-file reference list configured to store a plurality of fingerprints, each fingerprint of the plurality of fingerprints having an associated list of files and a hot attribute; and
a server configured to perform backup, the server having a processor operable to execute instructions causing the processor to:
store deduplicated data segments in the memory via application of the fingerprint-to-file reference list;
add a filename to the associated list of files for an existing fingerprint in the fingerprint-to-file reference list as a result of the server finding that a newly arriving fingerprint of a newly arriving data segment from a file having the filename matches the existing fingerprint, and the server finding that the hot attribute of the existing fingerprint is cleared, indicating an existing data segment in the memory, corresponding to the existing fingerprint, is not a hot segment;
set the hot attribute of the existing fingerprint in the fingerprint-to-file reference list as a result of the associated list of files for the existing fingerprint in the fingerprint-to-file reference list meeting or exceeding a predetermined size; and
exclude updating the associated list of files for the existing fingerprint in the fingerprint-to-file reference list as a result of the hot attribute of the existing fingerprint being set.

16. The data deduplication system of claim 15, wherein:
the server includes a backup server in communication with a deduplication server;
the backup server is configured to send data segments to the deduplication server for deduplication and storage; and
the backup server is further configured to apply a fingerprint/segment-to-file map for backup and restore operations.

17. The data deduplication system of claim 15, wherein the server is further configured to:

delete data segments from the memory that are unused in at least one stored backup;

delete fingerprints that are associated with the deleted data segments from the fingerprint-to-file reference list; and rebuild the fingerprint-to-file reference list.

18. The data deduplication system of claim 15, wherein the server is further configured to:

discard the newly arriving data segment as a result of the server finding that the newly arriving fingerprint matches the existing fingerprint.

* * * * *